United States Patent [19]
Farmer

[11] Patent Number: 5,504,602
[45] Date of Patent: Apr. 2, 1996

[54] LCD INCLUDING A DIFFUSING SCREEN IN A PLANE WHERE EMERGING LIGHT FROM ONE PIXEL ABUTS LIGHT FROM ADJACENT PIXELS

[75] Inventor: William J. Farmer, Kashiwa, Japan

[73] Assignee: Sharp Kabushiki Kaisha, Osaka, Japan

[21] Appl. No.: 134,103

[22] Filed: Oct. 8, 1993

[30] Foreign Application Priority Data

Oct. 12, 1992 [JP] Japan .................................. 4-272609

[51] Int. Cl.⁶ .............................................. G02F 1/1335
[52] U.S. Cl. ................................ 359/69; 359/40; 359/41
[58] Field of Search .................................. 359/40, 41, 69, 359/62

[56] References Cited

U.S. PATENT DOCUMENTS

| | | | |
|---|---|---|---|
| 5,151,801 | 4/1992 | Hiroshima | 359/40 |
| 5,161,042 | 11/1992 | Hamada | 359/41 |
| 5,187,599 | 2/1993 | Nakanishi et al. | 359/41 |

FOREIGN PATENT DOCUMENTS

| | | |
|---|---|---|
| 0366462 | 5/1990 | European Pat. Off. . |
| 0440495 | 8/1991 | European Pat. Off. . |
| 0440495A3 | 8/1991 | European Pat. Off. . |
| 0444872 | 9/1991 | European Pat. Off. . |

OTHER PUBLICATIONS

Patent abstracts of Japan; vol. 14, No. 150 (P-1025) Mar. 22, 1990 and JP-A-02 010 317 (Hitachi) Jan. 16, 1990.

Patent abstracts of Japan; vol. 15, No. 327 (P-1240) Aug. 20, 1991 and JP-A-03 120 517 (Seiko) May 22, 1991.

*Primary Examiner*—Anita Pellman Gross
*Assistant Examiner*—Toan Ton
*Attorney, Agent, or Firm*—David G. Conlin; Kevin J. Fournier

[57] ABSTRACT

A projection apparatus for holographic stereogram recording has a transmissive liquid crystal device and a diffusion screen. The transmissive liquid crystal device has a microlens array on its incident side and a polarizing sheet on its transmitting side. The microlenses are in one to one correspondence with the pixels of the liquid crystal device. The position of the diffusion screen is chosen such that the image transmitted to it from the liquid crystal device appears continuous.

6 Claims, 9 Drawing Sheets

LCD INCLUDING A DIFFUSING SCREEN IN A PLANE WHERE EMERGING LIGHT FROM ONE PIXEL ABUTS LIGHT FROM ADJACENT PIXELS

BACKGROUND OF THE INVENTION

1. Field of the Invention

The present invention is related to the field of holography, and constitutes an apparatus for projecting high quality images during the process of recording holographic stereograms.

2. Description of the Related Art

In the field of holographic imaging, a certain type of synthetic hologram, generally called a stereogram, is constructed by the sequential recording of a consecutive series of two dimensional perspective views. One method of capture for an appropriate sequence of images is to pass a 35 mm movie camera along a straight course, in front of a real scene or object and record the target object from various viewpoints. Of greater current interest is a second method of sequence generation which involves the application of computer graphics rendering techniques to three-dimensional databases. Whatever the method of capture, the sequence of images are subsequently recorded in a holographic medium, in a spatially multiplexed one-dimensional (horizontal parallax only) or two-dimensional (horizontal and vertical parallax) array. The holographic recording apparatus is shown in FIG. 6.

The holographic recording apparatus comprises (a) a holographic recording medium(51) standing immediately behind an opaque barrier(52), (b) the opaque barrier(52) containing a narrow slit(53) whose size is generally between 1 to 3 mm, (c) a diffusing screen(54) standing on the side of the opaque barrier(52) opposite to the holographic recording medium(51), the diffusing screen(54) being spatially separated from the opaque barrier(52) by a distance determined by the intended display parameters of the stereogram under construction, and (d) projection apparatus(55) sitting at some distance beyond the diffusing screen(54) on the side opposite to the opaque barrier(52) and the recording medium(51).

The recording method involves using a laser beam with the projection apparatus(55) to rear project an image onto the diffusing screen(54). The laser light from this projected image diffuses from every point on the screen(54) through the narrow slit(53) in the opaque barrier(52) and falls on the recording medium(51). A second laser beam(56), coherent to the projection beam, is simultaneously passed through the slit(53), where it interferes with the diffused image light, and this interference pattern is recorded as a hologram. The overall recording process involves moving the slit(53) after each recording by a distance equal to the slit width, revealing a neighboring section of the recording medium(51) and recording therein a projected image of the scene from an adjacent perspective view. The stereogram is built up by this step and repeat method of holographically recording adjacent perspective views in neighboring portions of the recording medium(51).

In the current state of the art images for holographic stereograms that are formed using computer graphic techniques are projected by one of two methods. In the first method, computer generated images are recorded on photographic film. After processing, the film is used as the projection medium. In the second method, a spatial light modulator, usually a liquid crystal television panel, is used as the projection medium. A representation of projection is shown in FIG. 7. A plane wave(57), formed of collimated laser light, transits an image bearing projection medium(58) which serves as the integral element of the projection apparatus(55) from FIG. 6. The light field, modulated by the image, travels to the diffusing screen(54), where the image becomes visible by the action of the diffusing screen(54).

The functional tradeoff between the two projection technologies is that while photographic film provides a high quality continuous image to the diffusing screen(54) and, thus, subsequently to the recording medium(51) via the slit(53), the fact that the film must be developed before it can be used as the projection medium(58) prevents this method from being completely automated. On the other hand, the spatial light modulator method allows complete automation of the stereogram recording process, but it provides an image of significantly reduced quality, most significantly containing a gridlike artifact, a consequence of the electronic control lines which matricize the projection panel.

FIG. 8 displays the case of a Liquid Crystal panel(59) performing the function of the projection medium(58) of FIG. 7. When the plane wave(57) encounters the LCD(59), portions of the plane wave are blocked by opaque cells(60), while other portions of the wave pass through transparent cells. When these portions of the wave that pass through the LCD fall incident upon the diffusing screen(54), they illuminate a portion(61) of the diffusing screen(54) proportional to the size of the cell, or pixel, of the LCD through which they passed. Because adjacent cells on the LC panel(59) are spatially separated to accommodate the thin-film-technology (TFT) control electronics(62), the portions(61) of the diffusing screen(54) illuminated by adjacent pixels will not abut, but will also have a spatial separation(63). This pixel separation(63) on the diffusing screen(54) is the source of the above mentioned gridlike artifact which limits the quality of the images produced by LCD projection devices.

The origin of this gridlike artifact can be further understood through FIG. 9. The degree to which an individual pixel(64) is transparent to light is managed by the action of the control electronics(65). These control electronics(65) are often protected by a shield matrix(66) to prevent overheating. The open area in the shield matrix forms an entrance aperture(67) to the pixels, and the open area between the control electronics(65) matrix forms an exit aperture(68). Even if every pixel in the LCD is set to be totally transparent, only that portion of the propagating wavefront(69) that will pass through both apertures(67,68) will continue to propagate. The shadow of the-shield matrix(66) and control electronics matrix(65) will form the gridlike artifact in the projected image.

SUMMARY OF THE INVENTION

It is therefore an object of the present invention to realize a projection apparatus for holographic stereogram recording, that, while employing a liquid crystal panel as the projection medium, produces a projected image, free of the gridlike artifact that has characterized image projected by liquid crystal panels.

The object of the invention mentioned above is achieved by a projection apparatus that has a transmissive liquid crystal panel with a microlens array on its incident face, the microlenses being in one to one correspondence with the pixel of the liquid crystal panel, and has a polarizing sheet on its transmitting face. A diffusing screen is set a prescribed distance from the liquid crystal panel. By the action of the microlenses and the distance from the liquid crystal panel to the diffusion screen, the light emerging from the adjacent pixels of the liquid crystal panel diverges, and abuts on the diffusing screen, so that the matrix grid is eliminated and the resulting image appears continuous.

Further objects and the advantages of the present invention will be apparent from the following description of the preferred embodiments of the invention as illustrated in the accompanying drawings.

DESCRIPTION OF THE PREFERRED EMBODIMENT

Figure 1:
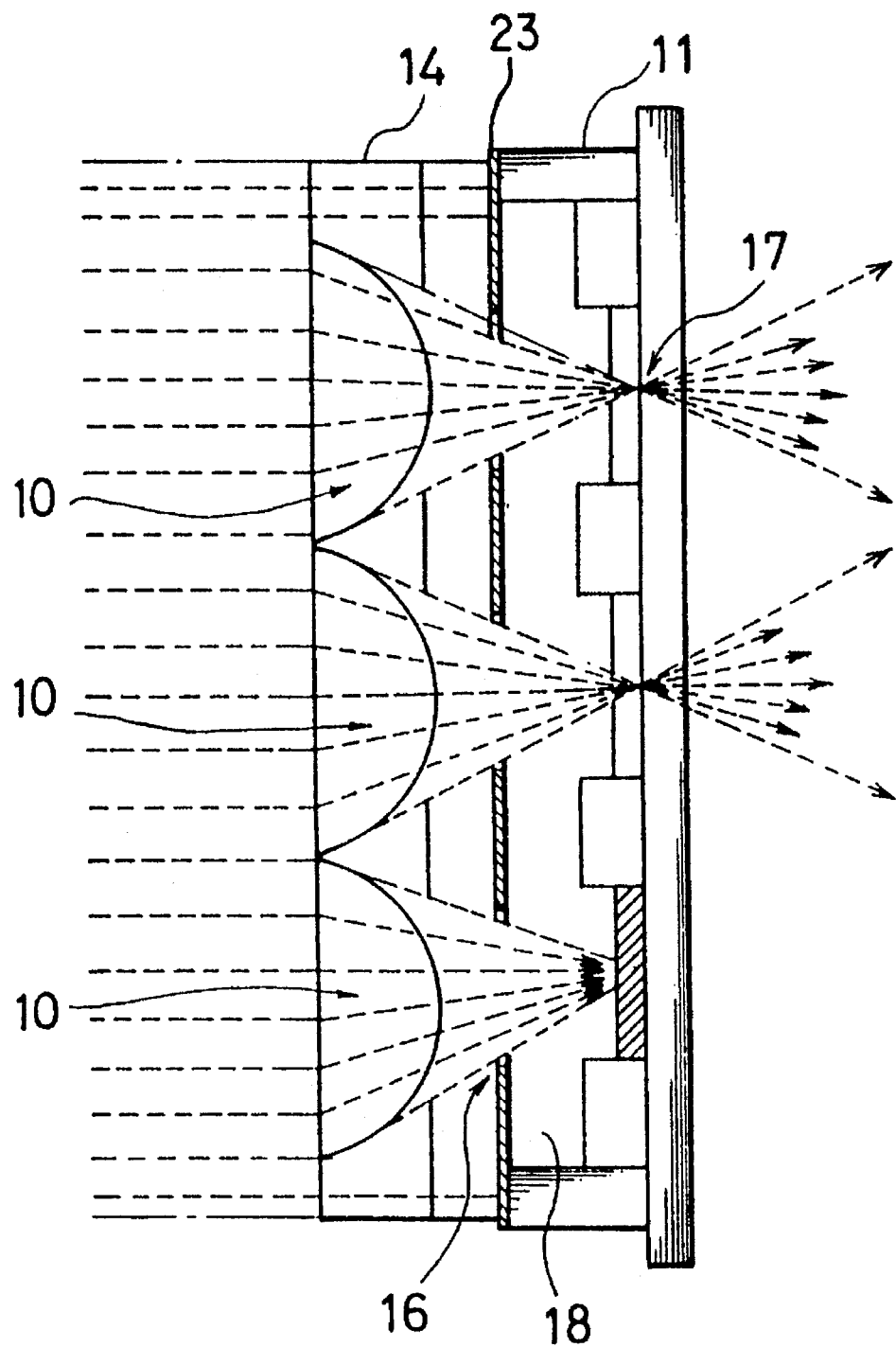
FIG. 1 is a plane view showing a liquid crystal panel, outfitted with a microlens array.

A recent development in LCD technology, represented by FIG. 1, has been to outfit the LC panel(11) with a microlens array(14). The microlenses(10) are matched in a one to one pattern with each pixel entrance aperture(16). The motivation of this development has been to increase the light efficiency of the device. Decreasing the amount of the light field which falls wastefully on the shield matrix(23) increases the illumination efficiency of the LCD. It, also, reduces the amount of heat that builds up in the device, extending its life expectancy.

The novel aspect of the projection apparatus described in this patent is that it uses this technology not only for reasons of increased efficiency, but also to improve the image quality of the projecting LDC by eliminating the gridlike artifact from the image. The grid pattern causes the image to appear pixelated and discontinuous. The device described will allow for complete automation of the stereogram recording process, while at the same time advantageously providing for recording a continuous image, free of this artifact.

Embodiments of the projection apparatus for holographic stereogram recording (referred to as "projection apparatus") can take a variety of forms. A general description of several will be given herein.

Figure 2:
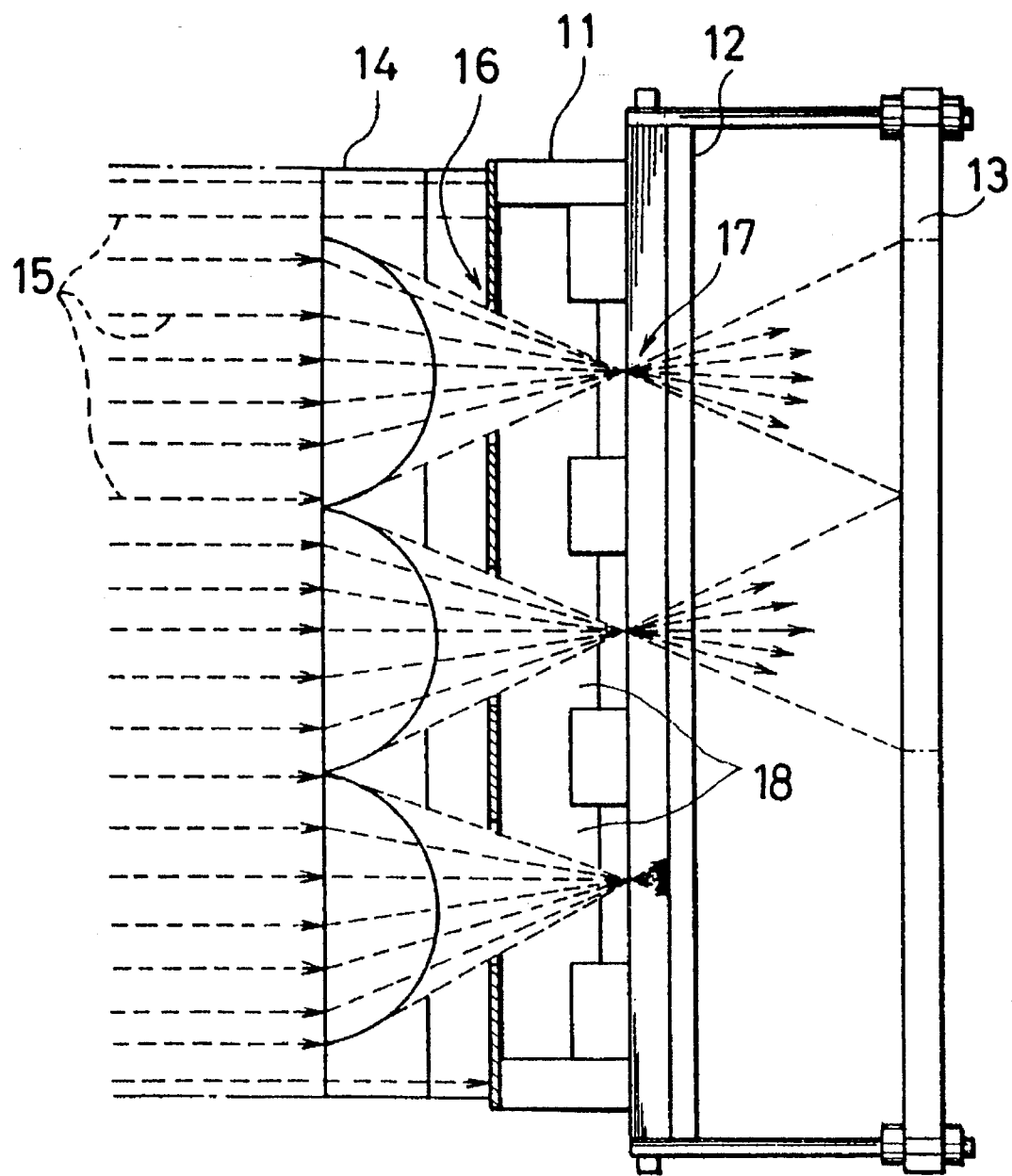
FIG. 2 is a plane view showing embodiment 1 of the projection apparatus for holographic stereogram recording according to the present invention.

FIG. 2 demonstrated the first embodiment of the invention. The apparatus shown in FIG. 2 consists of a liquid crystal display, device(11), a single polarizing sheet(12), a diffusing screen(13), and a microlens arrays(14). In this representation the microlens array(14) has a perfect fill factor, that is there is no gap between adjacent lenses(10). The plane wave(15) incident on the microlens array is focused through the apertures(16,17) of the LCD(11). Because laser light is used in the recording process, the incident light field(15) can be appropriately polarized so that the initial polarization screen used in most LCD's is not necessary. As the light passes through the liquid crystal layer(18) of the LCD(11) between the entrance aperture(16) and the exit aperture(17), the polarization of the light is manipulated. Emerging from the exit aperture(17), the light from each pixel encounters a polarizing sheet(12), called the analyzer which controls the transmission of light according to its polarization state. The light that is transmitted by the polarizing sheet(12) is allowed to continue diverging until the light from each pixel has expanded to a size that it just meets the light expanding from an adjacent pixel. Placing the diffusing screen(13) in the plane where the emerging light abuts the light from its adjacent neighbors results in the image on the diffusing screen(13) appearing continuous, without the gridlike artifact that has to date characterized LCD projected images. In this representation, the diffusing screen(13) is shown connected to the LCD(11) body to keep the distance between them fixed.

Even when the microlens array does not have a perfect fill factor, the projection apparatus shown in FIG. 1 can be used to project a continuous image, by adjusting the distance from the LCD (11) to the diffusing screen (13).

Figure 3:
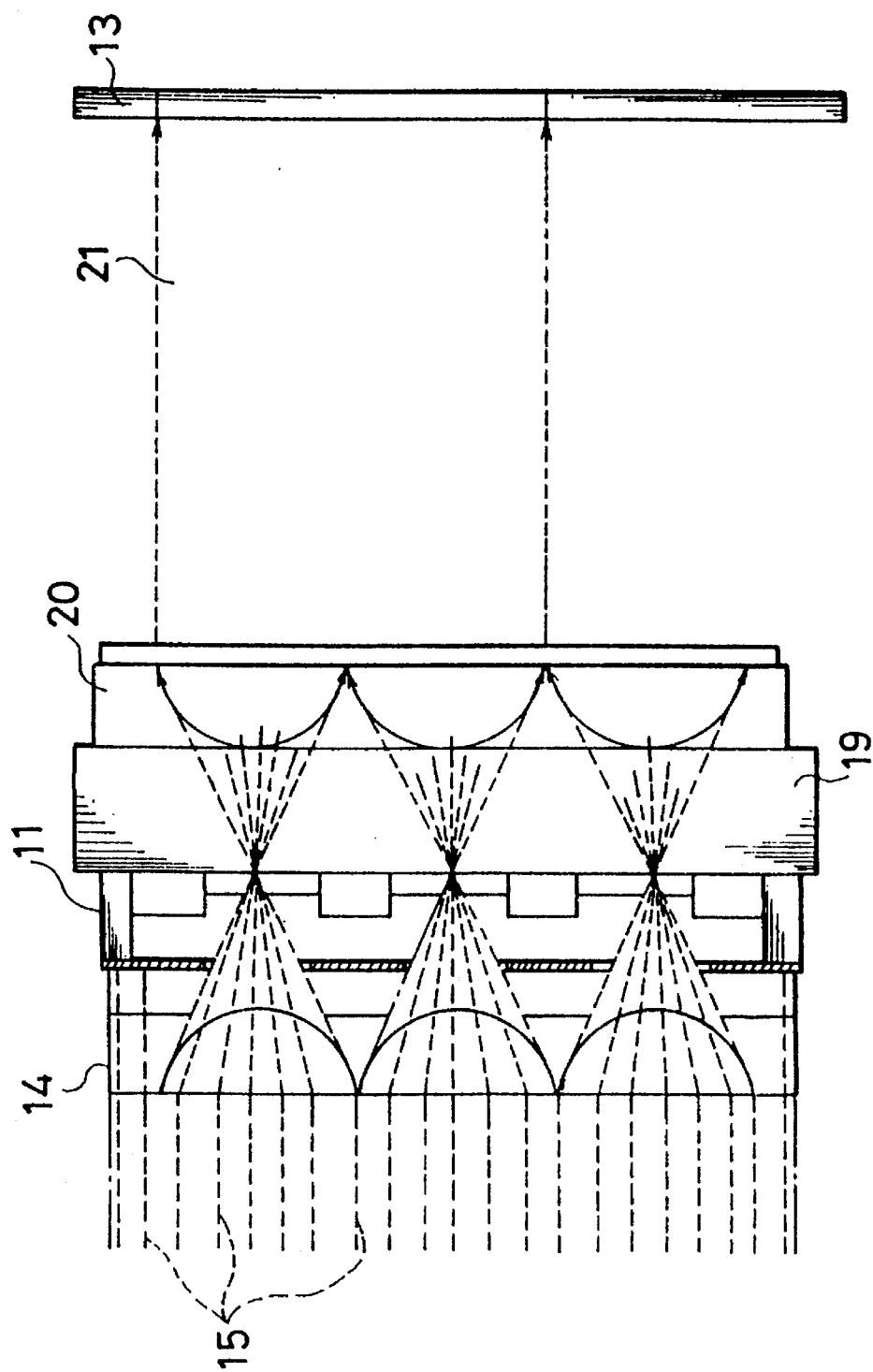
FIG. 3 is a plane view showing embodiment 2 of the projection apparatus for holographic stereogram recording according to the present invention.

A second embodiment is shown in FIG. 3.

In this representation, a transparent spacer(19), is attached to the LCD(11) to which in turn is attached a second microlens array(20). The second microlens array(20) has a perfect fill factor. The relative focal lengths of the first array(14) and the second array(20) as well as their separation are carefully controlled so that the incident plane wave(15) focused by the first microlens array(14) will be recollimated upon emergence from the second lens array(20). Again, in this embodiment a polarizing sheet(12) serves as a transmission filter. The light field(21) propagating from the second microlens array(20) has been modulated with the image on the LCD(11), and by the action of the microlens arrays(14,20), the image is without the gridlike artifact. Because the emergent light field(21) is collimated, the diffusing screen(13) can be spatially removed from the LCD apparatus and positioned according to the convenience of the holographer.

Figure 4:
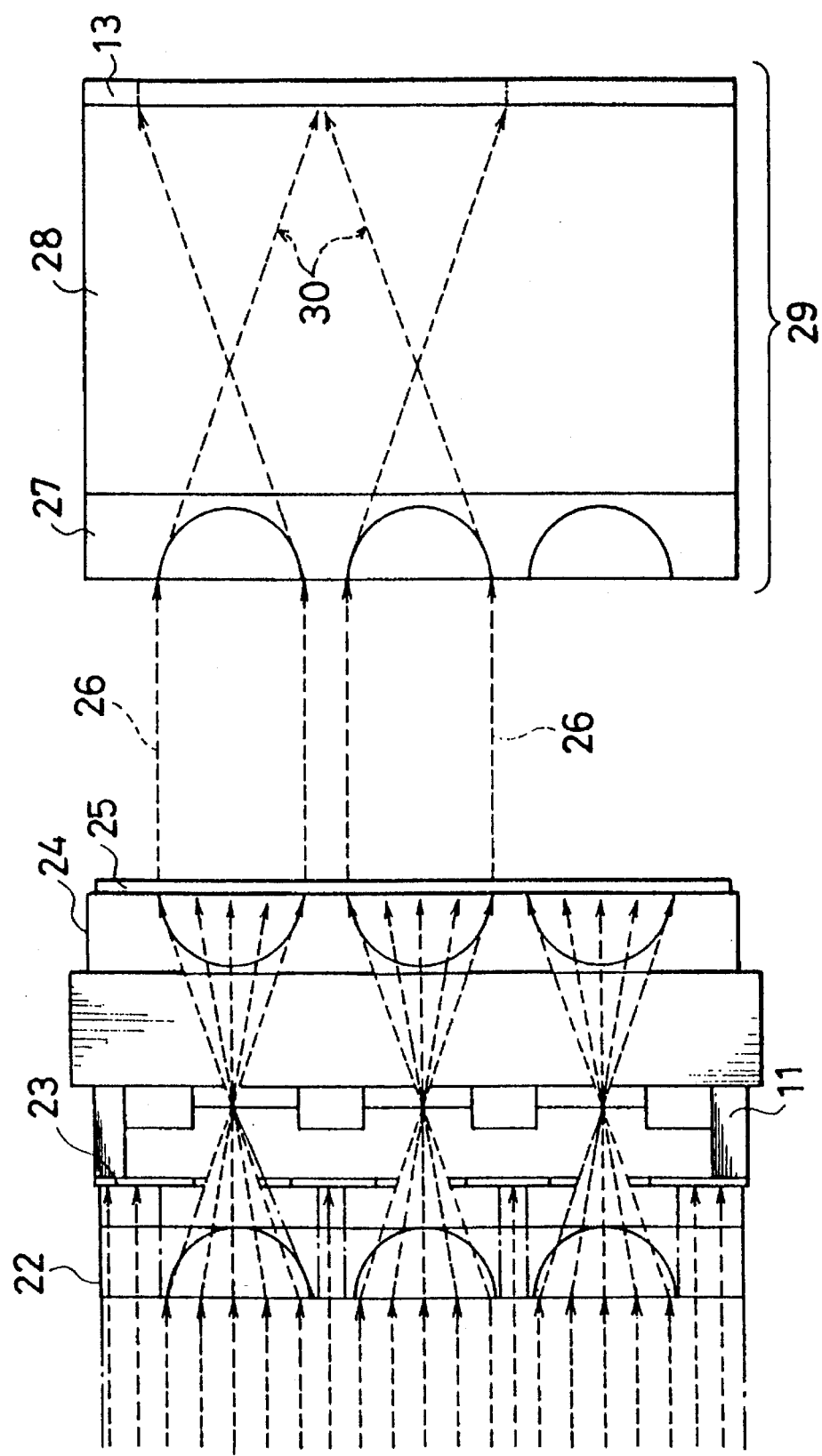
FIG. 4 is a plane view showing embodiment 3 of the projection apparatus for holographic stereogram recording according to the present invention.

A third embodiment, shown in FIG. 4, represents the case in which the microlenses(10) do not have a perfect fill factor. In this case, there is a loss in efficiency because some of the impinging light field(15) is not incident on one of the lenses of the first array(22) and propagates wastefully to the shield matrix(23). Here, as in the second embodiment in FIG. 3, a second microlens array(24) is used to recollimate the output of each pixel, and, once again, a polarized sheet(25) is used to filter the image output via polarization. Then, the spatially discontinuous emerging light field(26) propagates to a spatially separated apparatus(29) consisting of a third lens array(27), a spacer(28) and a diffusing screen(13). As in the first embodiment, the distance from lens array(27) to diffusing screen(13) is carefully controlled such that the light(30) from adjacent pixels just abuts upon arrival at the diffusing screen(13). Here, also, because the output of the second microlens array(24) is collimated, the second apparatus(29) can be optionally placed according to the convenience of the holographer.

Figure 5:
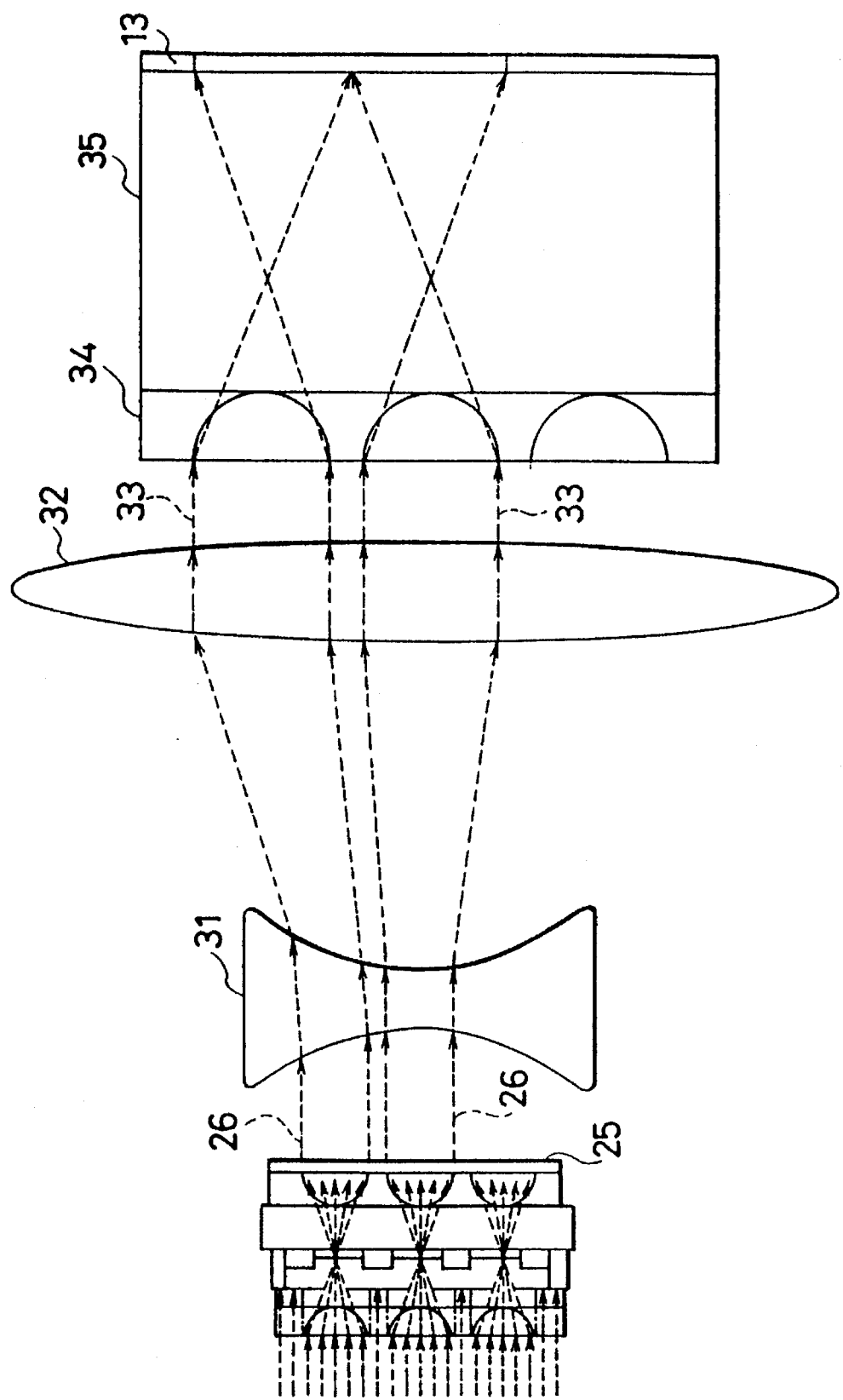
FIG. 5 is a plane view showing an arrangement for expanding a projected image, using the projection apparatus for holographic stereogram recording shown in FIG. 4.
Figure 6:
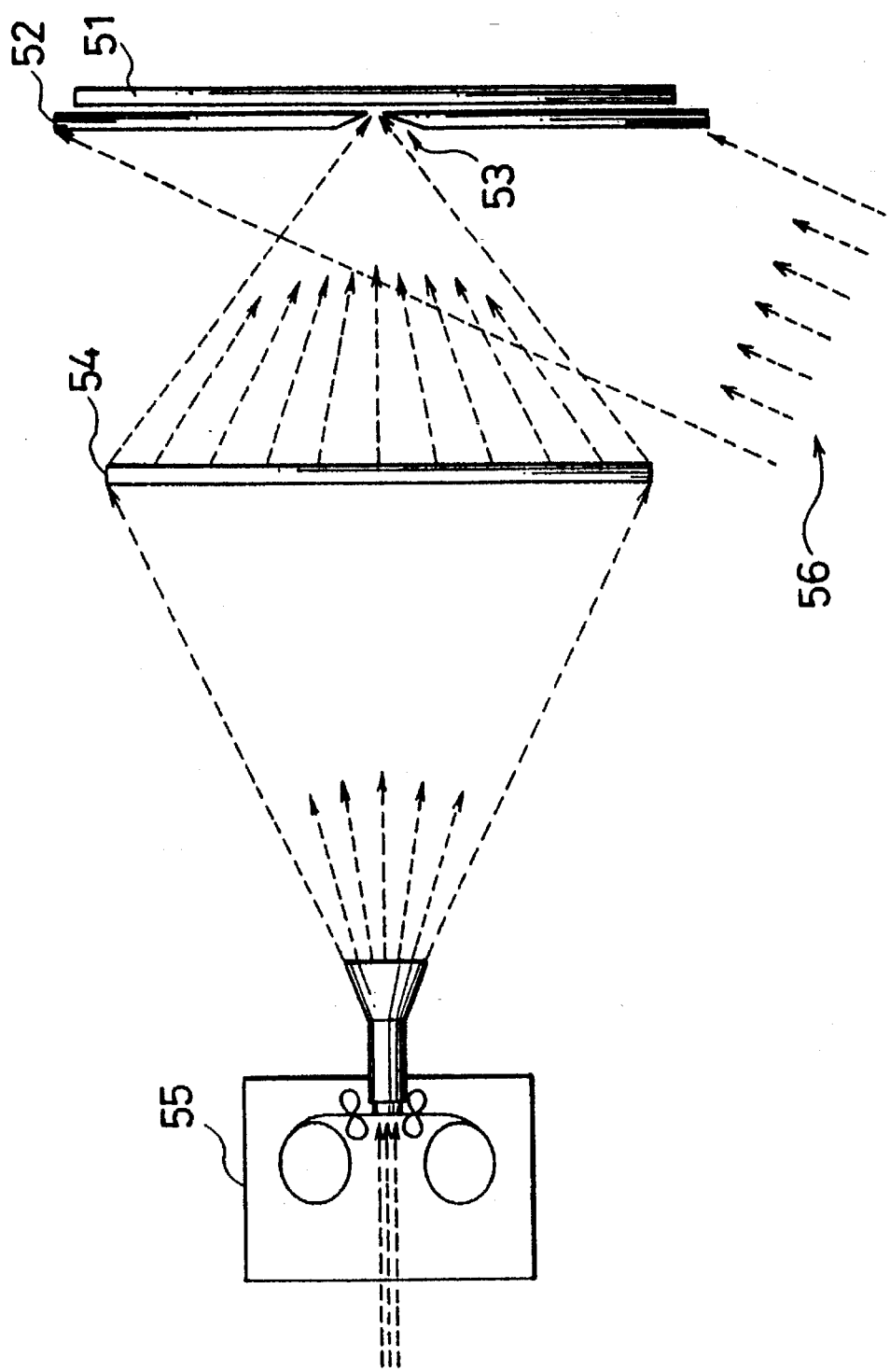
FIG. 6 is a plane view showing the apparatus for holographic stereogram recording according to the prior art.
Figure 7:
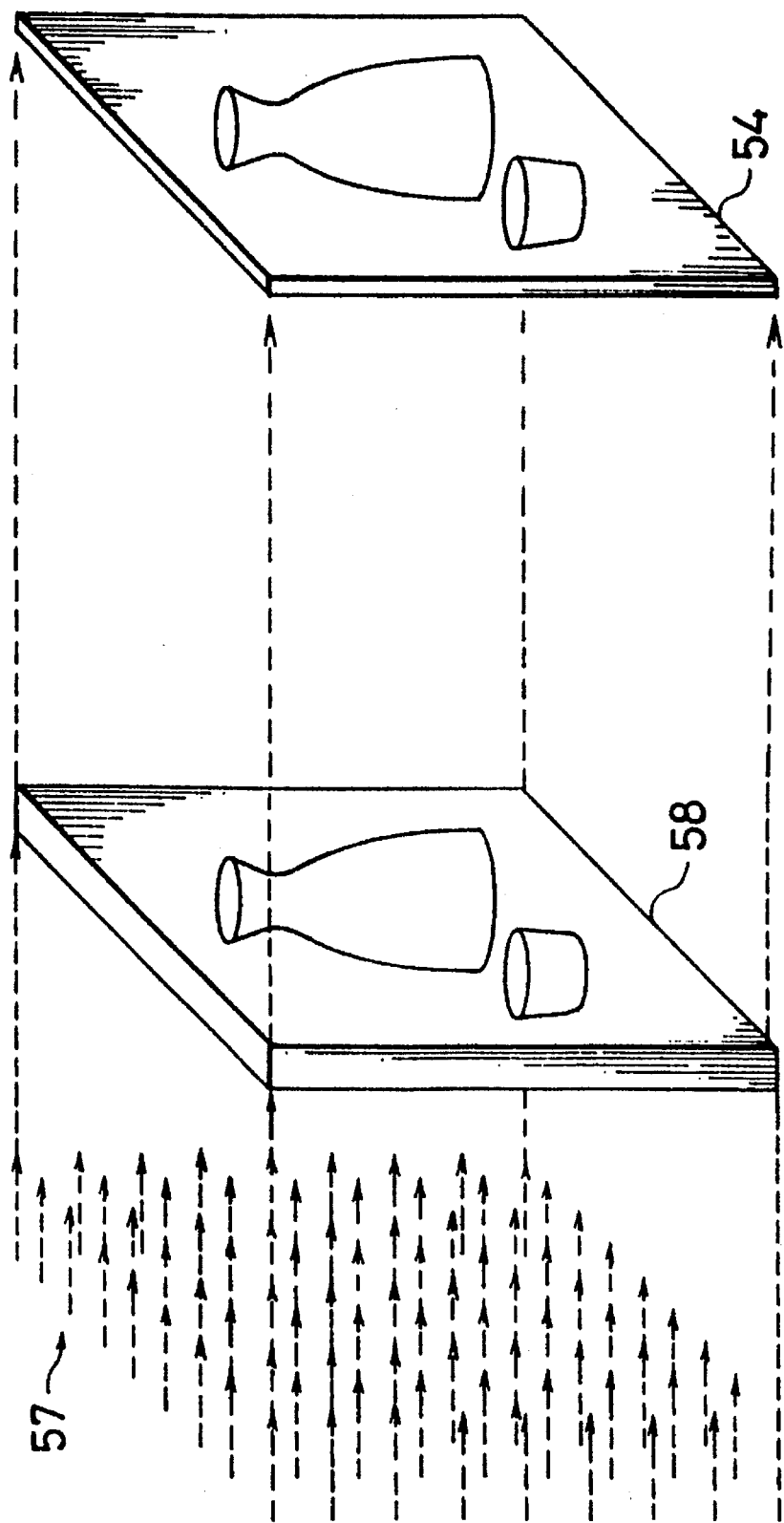
FIG. 7 is an explanation drawing showing a projection method for holographic stereogram recording according to the prior art.
Figure 8:
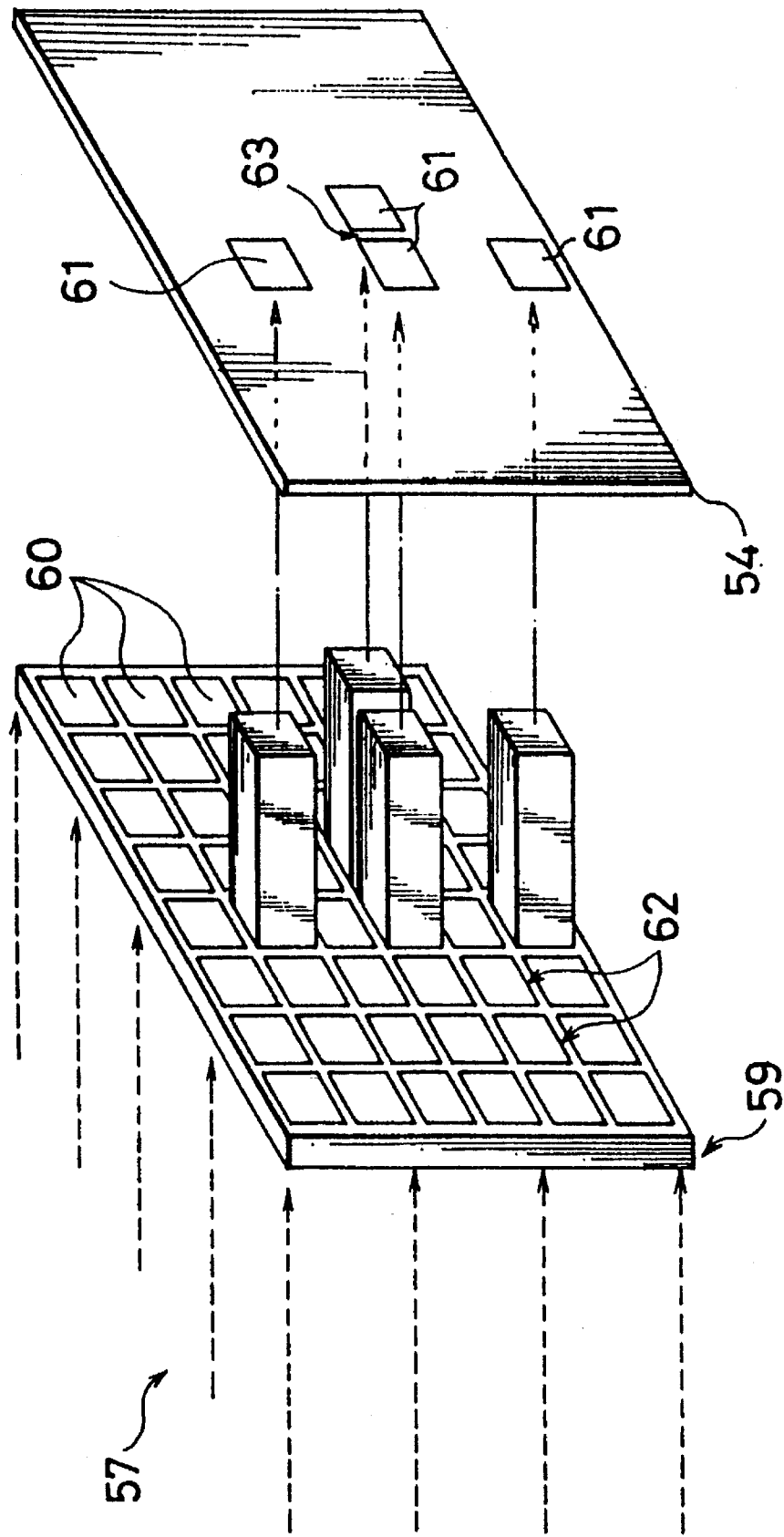
FIG. 8 is an explanation drawing showing a liquid crystal panel providing the function of the projection medium according to the prior art.
Figure 9:
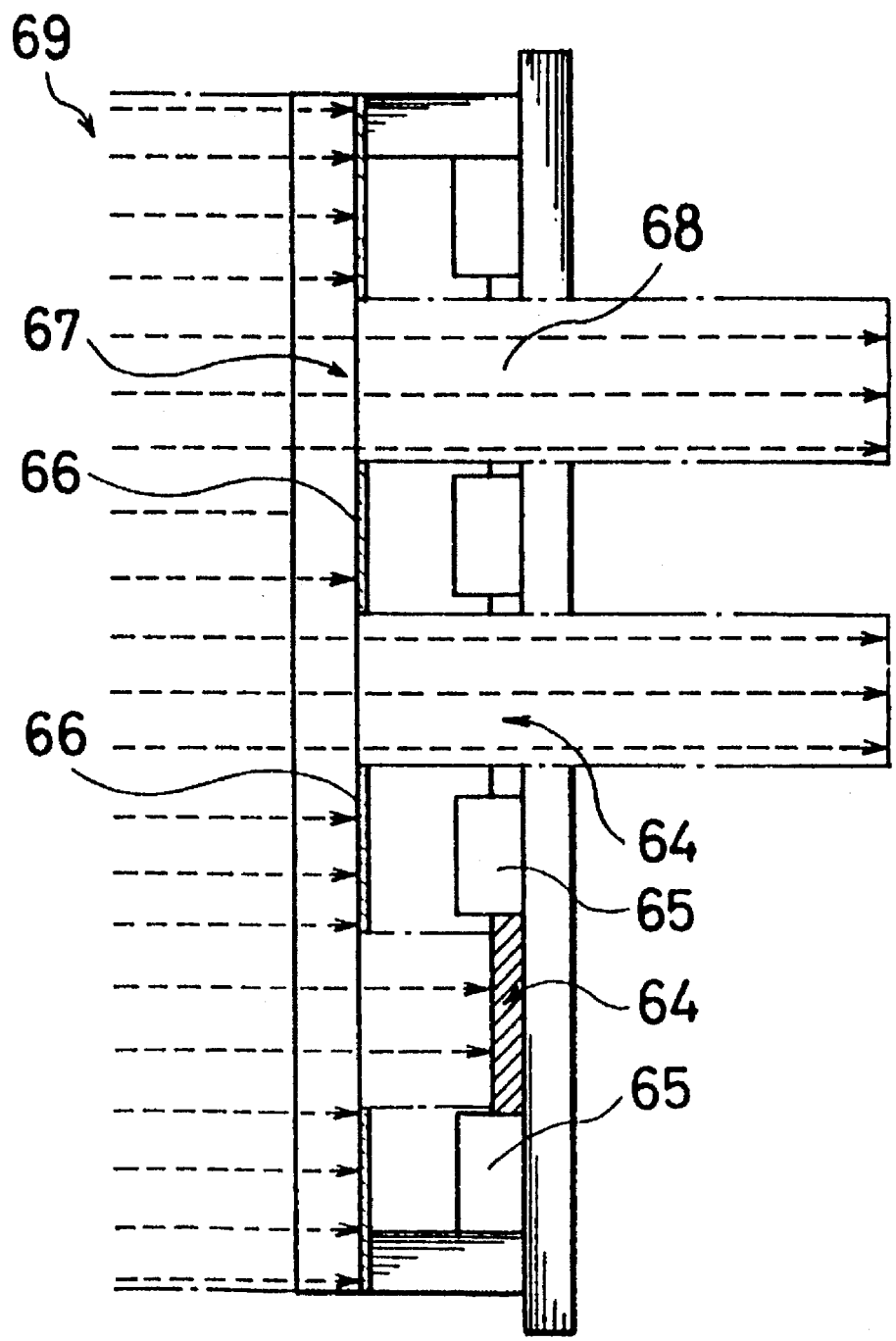
FIG. 9 is an explanation drawing showing the origin of the gridlike artifact according to the prior art.

In embodiments two (FIG. 3) and three (FIG. 4), the light field emerging from the second microlens array (3.20, 4.24) is collimated. Because of this, the light field can be further manipulated as a whole. Specifically, the image can be magnified, giving an added element of control to the holographer. In each of the representational figures, the image that falls on the diffusing screen(13) is the same size as the image appearing on the LC device(11). This situation would restrict the holographer to making holographic stereograms that were of the same dimensions as the LC device(11). Common practice in stereography is for holographers to expand (or contract) the image from the projection device, to suit the dimensions of their intended holographic stereogram. Because the emerging light field(3.21, 4.26) in these two embodiments can be manipulated as a whole, the holographer is also able to expand (or contract) this light field. In the case of embodiment two (FIG. 3) this can be done by expanding the light field(21) with a single lens element and placing the diffusing screen(13) at the point at which the image has expanded to the appropriate size. In the case of embodiment 3 (FIG. 4), the manipulation is a bit more complicated, as shown in FIG. 5. Here the emerging collimated light field(26) is expanded by the first lens(31) and then recollimated by the second lens(32). The light field(33) emerging from the second lens(32) has the same duty cycle as the light field(26) that emerged from the polarized sheet(25), that is that the ratio of pixel size to gap size will be the same, however the total field dimension will have been changed. As in embodiment 3 (FIG. 4), a third lens array(34), here, however, matched to the size of the expanded (or contracted) recollimated light field(33), is used to refocus the incident collimated light field(33) through the spacer(35) and onto the diffusing screen(13). In FIGS. 4 and 5, the action of the third lens array(4.27, 5.34) was shown to be convergent, but in the case of this third array(4.27, 5.34) a diverging lens array could be optionally used.

Many widely different embodiments of the present invention may be constructed without departing from the spirit and the scope of the present invention. It should be understood that the present invention is not limited to the specific embodiments described in the specification, except as defined in the appended claims.

What is claimed is:

1. An apparatus for use in holographic stereogram recording, comprising:
   a transmissive liquid crystal device having
      a microlens array disposed on an incident side of said transmissive liquid crystal device,
      a liquid crystal layer, each pixel of which is provided with an entrance aperture and an exit aperture in such a manner that light from a microlens of said microlens array is made to run through the entrance aperture, focused in the pixel and made to diverge through the exit aperture and
      a polarizing sheet disposed on a transmitting side of said liquid crystal device; and
   a diffusing screen located in a plane where emerging light having diverged from a pixel through said polarizing sheet abuts light having diverged from adjacent pixels in such a manner that an image on said diffusing screen appears continuous without gridlike artifacts.

2. An apparatus according to claim 1, further comprising a second microlens array being disposed on the transmitting side of said liquid crystal device, wherein the respective focal lengths and separation of said two microlens arrays are carefully controlled such that the output light field of said second microlens array is collimated thereby allowing increased freedom of placement to said diffusing screen.

3. An apparatus according to claim 2, wherein gaps exist between adjacent microlenses of said microlens arrays and a third microlens array is positioned a carefully controlled distance in front of said diffusing screen to produce the continuous image.

4. An apparatus according to claim 1, in which a projection lens system is used to project and magnify the plane of the continuous image onto said diffusing screen.

5. An apparatus according to claim 2, wherein one or more lenses is/are used to magnify the output image is/are between a liquid crystal device section and a diffusing screen section of said apparatus.

6. An apparatus according to claim 3, wherein one or more lenses used to magnify the output image are located between said second microlens array of the liquid crystal device section and said third microlens array of the diffusing screen section of said apparatus.

* * * * *